Dec. 19, 1933.  J. KONSTANTINOFF  1,940,056
PACKING DEVICE FOR CYLINDRICAL BODIES OR LINERS
Filed Oct. 26, 1931
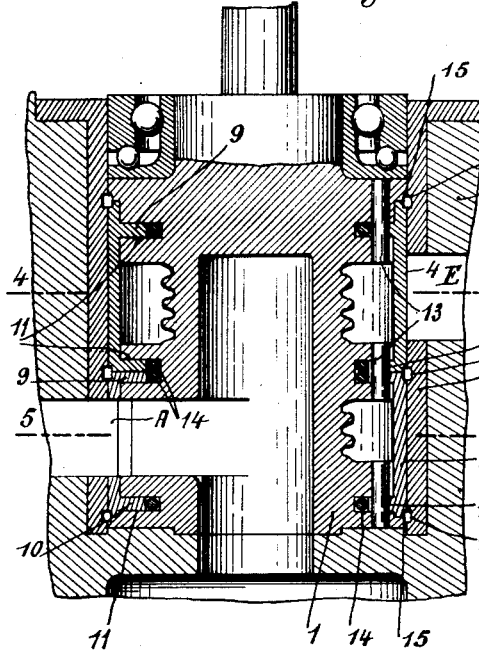
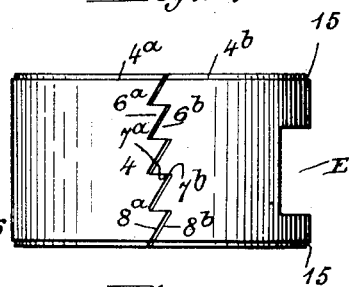
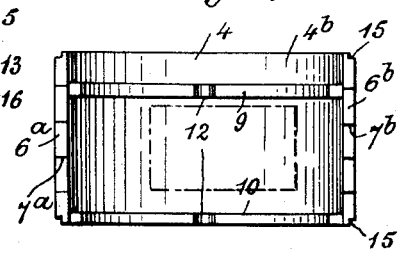
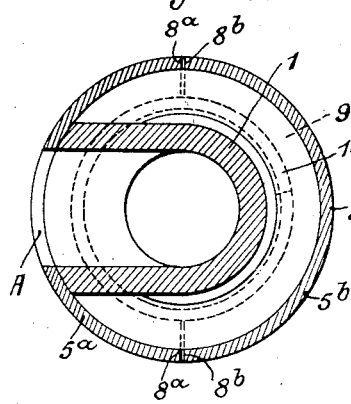
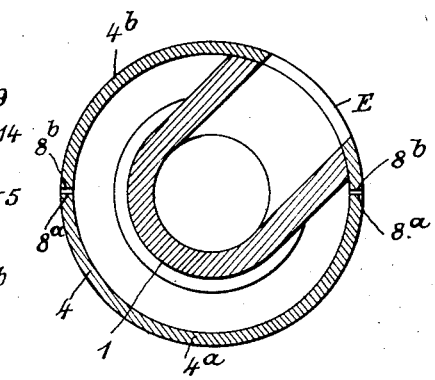
INVENTOR
Jean Konstantinoff.
By Lacey & Lacey,
Attys Patented Dec. 19, 1933

1,940,056

UNITED STATES PATENT OFFICE 1,940,056

PACKING DEVICE FOR CYLINDRICAL BODIES OR LINERS

Jean Konstantinoff, Paris, France

Application October 26, 1931, Serial No. 571,264, and in France October 27, 1930

4 Claims. (Cl. 123—80)

The present invention has for an object a packing device for cylindrical liners or bodies which are movable within a chamber of corresponding shape, such as the rotary distributors and the pistons of internal combustion engines.

The said device is essentially constituted by a ring diametrically cut into two parts which are located within a suitable cavity provided around the cylindrical body and submitted to the influence of spring members which tend to move them apart so as to press them against the wall of the chamber, these two parts are connected together by means of teeth intermeshing and having, respectively, an edge forming a right angle with the axis of the cylindrical liner or body and an inclined edge forming with the first one an angle of about 60°. The teeth which are formed in this manner afford at the meeting joints of both half-rings a series of baffles opposing themselves respectively to the passage of the gaseous fluid in the axial direction, and thus a considerable tight packing is obtained.

The carrying out of the invention further comprises various other important features which are disclosed in the following description with reference to the accompanying drawing which shows, by way of example, a form of construction of the packing device in connection with a rotary distributor.

Figure 1 is a vertical axial section of a distributor provided with two packing rings.

Figure 2 shows in elevation one of the rings with its two elements connected together.

Figure 3 is an inner view of one of the half-rings.

Figures 4 and 5 are, respectively, horizontal sections of the distributor according to lines 4—4 and 5—5 of Figure 1.

In the example as represented the rotary distributor 1, revolving in a cylindrical case or jacket 2 secured in the head 3 of the engine cylinder, is provided with two packing rings 4 and 5 disposed the one above the other, located in a suitable recess formed in its surface and having ports A and E corresponding to the inlet and outlet orifices of the distributor. The said rings are respectively cut diametrically into two parts 4a, 4b, (Fig. 4) and 5a, 5b, (Fig. 5) the joints of the half-rings 4a, 4b, and those of the half-rings 5a, 5b being situated in two different planes, so as to create a discontinuity from one ring to the other. According to the invention, the said joints are constituted by teeth 6a, 6b (Fig. 2) formed on each one of the half-rings and fitting exactly the one into the other. These teeth have their edges or ridges 7a, 7b at right angle to the axis of the distributor, their edges 8a, 8b forming with the latter an angle of about 60°.

The rings are internally provided with ribs 9 and 10 engaged in corresponding grooves of the body of the distributor 1. On the ribs 9, 10 are provided notches 12 fitted about studs 13 secured in the grooves 11 and adapted to prevent the rings to rotate. Between the ribs 9, 10 and the bottom of the grooves 11 are interposed elastic segments or springs 14 tending to move apart or separate the half-rings 4a, 4b, and 5a, 5b so as to maintain the same pressed against the wall of the jacket 2. In order to prevent thrust on the wall of the jacket 2 adjacent the ends of the rings 4 and 5, said rings are provided with annular grooves 15 which cooperate with channels 16 in the jacket. The carbon deposits eventually formed will be disposed within a channel 16 and by virtue of the fact that the grooves 15 are formed in the rings, the deposits of carbon will not prevent proper working of the valve. It will be seen that the rings 4 and 5 are thereby accorded a perfect contact with the jacket 2. On the other hand, as it has been hereinbefore explained, the horizontal edges or ridges of the teeth 6a, 6b oppose themselves to the passage of the fluid streams which tend to penetrate between the joints or meeting edges of the half-rings. In this manner, a tight packing or tightness which is as complete as possible is obtained in the distributor.

The invention is obviously not limited to the example which has been shown and described. The same can be used in connection with the pistons of internal combustion engines and receive any convenient constructive adaptation, both as regards the number and the arrangement of the rings as also the way in which they are secured.

I claim:

1. A packing device for cylindrical bodies or liners including a ring comprising companion parts disposed within a jacket provided within the body, and spring elements engaging the parts of the ring and tending to move said parts against the wall of the jacket, said parts being connected by interengaging teeth provided with an edge at right angles to the axis of the body and with an edge inclined with respect to said first-mentioned edge.

2. A packing device for a rotary valve of an internal combustion engine having a body, including rings carried in the body and provided with internal ribs engaging in corresponding grooves in the body, and a spring member carried in the groove between the rib and the bottom of said groove and normally urging the rings outwardly.

3. A packing device for a rotary valve of an internal combustion engine having a body, including rings carried in the body and having ribs formed with notches receiving a stud secured in a groove in the body whereby rotation of the rings within the body will be prevented.

4. A packing device for the valve system of a rotary valve internal combustion engine, said valve having a body and a jacket, rings disposed in a groove on the body and having ribs, springs carried on the body between the ribs and the body and urging the rings against the jacket, said rings being split diametrically and provided with teeth comprising inclined edges and straight edges, and studs carried by the body and engaging the ribs for locking the rings against rotation on the body.

JEAN KONSTANTINOFF.